US012812610B2

(12) United States Patent
Ratasuk et al.

(10) Patent No.: US 12,812,610 B2
(45) Date of Patent: Nov. 24, 2026

(54) TIME DOMAIN RESOURCE ALLOCATION OF RANDOM ACCESS MESSAGE FOR REDUCED CAPABILITY DEVICES

(71) Applicant: Nokia Technologies Oy, Espoo (FI)

(72) Inventors: Rapeepat Ratasuk, Naperville, IL (US); Nitin Mangalvedhe, Naperville, IL (US)

(73) Assignee: NOKIA TECHNOLOGIES OY, Espoo (FI)

( * ) Notice: Subject to any disclaimer, the term of this patent is extended or adjusted under 35 U.S.C. 154(b) by 274 days.

(21) Appl. No.: 18/623,649

(22) Filed: Apr. 1, 2024

(65) Prior Publication Data

US 2024/0340867 A1 Oct. 10, 2024

Related U.S. Application Data

(60) Provisional application No. 63/457,562, filed on Apr. 6, 2023.

(51) Int. Cl.
*H04J 3/00* (2006.01)
*H04W 72/0446* (2023.01)

(52) U.S. Cl.
CPC ............................... *H04W 72/0446* (2013.01)

(58) Field of Classification Search
CPC .. H04W 72/0446; H04W 72/21; H04W 28/04
See application file for complete search history.

(56) References Cited

U.S. PATENT DOCUMENTS

| | | | | |
|---|---|---|---|---|
| 12,245,208 B2 * | 3/2025 | Shi | H04W 72/0446 | |
| 12,562,837 B2 * | 2/2026 | Elshafie | H04L 1/0013 | |
| 2022/0046617 A1 * | 2/2022 | Sasaki | H04L 5/0053 | |
| 2022/0159652 A1 * | 5/2022 | Bae | H04W 72/0446 | |
| 2023/0007651 A1 * | 1/2023 | Shi | H04W 72/0446 | |
| 2023/0137523 A1 * | 5/2023 | Babaei | H04L 1/1887 | 370/329 |
| 2023/0224953 A1 * | 7/2023 | Xiong | H04L 1/0009 | 370/329 |
| 2023/0319841 A1 * | 10/2023 | Ratasuk | H04L 1/0063 | 370/329 |
| 2023/0379802 A1 * | 11/2023 | Bhatoolaul | H04W 48/12 | |
| 2024/0107533 A1 * | 3/2024 | Hwang | H04L 1/0061 | |

(Continued)

*Primary Examiner* — Abdelnabi O Musa

(74) *Attorney, Agent, or Firm* — Carter, DeLuca & Farrell LLP

(57) ABSTRACT

Systems, methods, apparatuses, and computer program products for allowing for larger processing time for reduced capability user equipment without increasing the message 3 transmission delay for legacy user equipment. One method may include a UE receiving at least one time domain resource assignment extension indication from a network entity; determining whether at least one first message early indication is configured and whether time domain resource assignment extension is enabled based on the received at least one time domain resource assignment extension indication; and, upon determining that at least one first message early indication is configured and that time domain resource assignment extension is enabled, determining a timing of a second message based on the at least one time domain resource assignment extension indication and a time parameter associated with the at least one time domain resource assignment extension.

1 Claim, 6 Drawing Sheets

(56) References Cited

U.S. PATENT DOCUMENTS

| | | | | |
|---|---|---|---|---|
| 2024/0188054 | A1 * | 6/2024 | Qiao | H04L 5/1469 |
| 2024/0195523 | A1 * | 6/2024 | Elshafie | H04L 1/1854 |
| 2024/0340852 | A1 * | 10/2024 | Jeong | H04W 76/27 |
| 2025/0261199 | A1 * | 8/2025 | Furuyama | H04W 72/1268 |
| 2026/0052489 | A1 * | 2/2026 | Myung | H04J 11/0079 |

* cited by examiner

TIME DOMAIN RESOURCE ALLOCATION OF RANDOM ACCESS MESSAGE FOR REDUCED CAPABILITY DEVICES

TECHNICAL FIELD

Some example embodiments may generally relate to mobile or wireless telecommunication systems, such as 3rd Generation Partnership Project (3GPP) Long Term Evolution (LTE), 5th generation (5G) radio access technology (RAT), new radio (NR) access technology, 6th generation (6G), and/or other communications systems. For example, certain example embodiments may relate to systems and/or methods for allowing for larger processing time for reduced capability user equipment without increasing the message 3 transmission delay for legacy user equipment.

BACKGROUND

Examples of mobile or wireless telecommunication systems may include radio frequency (RF) 5G RAT, the Universal Mobile Telecommunications System (UMTS) Terrestrial Radio Access Network (UTRAN), LTE Evolved UTRAN (E-UTRAN), LTE-Advanced (LTE-A), LTE-A Pro, NR access technology, and/or MulteFire Alliance. 5G wireless systems refer to the next generation (NG) of radio systems and network architecture. A 5G system is typically built on a 5G NR, but a 5G (or NG) network may also be built on E-UTRA radio. It is expected that NR can support service categories such as enhanced mobile broadband (eMBB), ultra-reliable low-latency-communication (URLLC), and massive machine-type communication (mMTC). NR is expected to deliver extreme broadband, ultra-robust, low-latency connectivity, and massive networking to support the Internet of Things (IoT). The next generation radio access network (NG-RAN) represents the radio access network (RAN) for 5G, which may provide radio access for NR, LTE, and LTE-A. It is noted that the nodes in 5G providing radio access functionality to a user equipment (UE) (e.g., similar to the Node B in UTRAN or the Evolved Node B (eNB) in LTE) may be referred to as next-generation Node B (gNB) when built on NR radio, and may be referred to as next-generation eNB (NG-eNB) when built on E-UTRA radio.

SUMMARY

In accordance with some example embodiments, a method may include receiving, by a user equipment, at least one time domain resource assignment extension indication from a network entity. The method may further include determining, by the user equipment, whether at least one first message early indication is configured and whether time domain resource assignment extension is enabled based on the received at least one time domain resource assignment extension indication. The method may further include, upon determining that at least one first message early indication is configured and that time domain resource assignment extension is enabled, determining, by the user equipment, a timing of a second message based on the at least one time domain resource assignment extension indication and a time parameter associated with the at least one time domain resource assignment extension.

In accordance with certain example embodiments, an apparatus may include means for receiving at least one time domain resource assignment extension indication from a network entity. The apparatus may further include means for determining whether at least one first message early indication is configured and whether time domain resource assignment extension is enabled based on the received at least one time domain resource assignment extension indication. The apparatus may further include means for, upon determining that at least one first message early indication is configured and that time domain resource assignment extension is enabled, determining a timing of a second message based on the at least one time domain resource assignment extension indication and a time parameter associated with the at least one time domain resource assignment extension.

In accordance with various example embodiments, a non-transitory computer readable medium may include program instructions that, when executed by an apparatus, cause the apparatus to perform at least a method. The method may include receiving at least one time domain resource assignment extension indication from a network entity. The method may further include determining whether at least one first message early indication is configured and whether time domain resource assignment extension is enabled based on the received at least one time domain resource assignment extension indication. The method may further include, upon determining that at least one first message early indication is configured and that time domain resource assignment extension is enabled, determining a timing of a second message based on the at least one time domain resource assignment extension indication and a time parameter associated with the at least one time domain resource assignment extension.

In accordance with some example embodiments, a computer program product may perform a method. The method may include receiving at least one time domain resource assignment extension indication from a network entity. The method may further include determining whether at least one first message early indication is configured and whether time domain resource assignment extension is enabled based on the received at least one time domain resource assignment extension indication. The method may further include, upon determining that at least one first message early indication is configured and that time domain resource assignment extension is enabled, determining a timing of a second message based on the at least one time domain resource assignment extension indication and a time parameter associated with the at least one time domain resource assignment extension.

In accordance with certain example embodiments, an apparatus may include at least one processor and at least one memory storing instructions that, when executed by the at least one processor, cause the apparatus at least to receive at least one time domain resource assignment extension indication from a network entity. The at least one memory and instructions, when executed by the at least one processor, may further cause the apparatus at least to determine whether at least one first message early indication is configured and whether time domain resource assignment extension is enabled based on the received at least one time domain resource assignment extension indication. The at least one memory and instructions, when executed by the at least one processor, may further cause the apparatus at least to, upon determining that at least one first message early indication is configured and that time domain resource assignment extension is enabled, determine a timing of a second message based on the at least one time domain resource assignment extension indication and a time parameter associated with the at least one time domain resource assignment extension.

In accordance with various example embodiments, an apparatus may include receiving circuitry configured to receive at least one time domain resource assignment extension indication from a network entity. The apparatus may further include first determining circuitry configured to determine whether at least one first message early indication is configured and whether time domain resource assignment extension is enabled based on the received at least one time domain resource assignment extension indication. The apparatus may further include second determining circuitry configured to, upon determining that at least one first message early indication is configured and that time domain resource assignment extension is enabled, determine a timing of a second message based on the at least one time domain resource assignment extension indication and a time parameter associated with the at least one time domain resource assignment extension.

In accordance with some example embodiments, a method may include transmitting, by a network entity, at least one time domain resource assignment extension indication to a user equipment. The method may further include receiving, by a network entity, from the user equipment a first message indicating at least one capability of the user equipment.

In accordance with certain example embodiments, an apparatus may include means for transmitting at least one time domain resource assignment extension indication to a user equipment. The apparatus may further include means for receiving from the user equipment a first message indicating at least one capability of the user equipment.

In accordance with various example embodiments, a non-transitory computer readable medium may include program instructions that, when executed by an apparatus, cause the apparatus to perform at least a method. The method may include transmitting at least one time domain resource assignment extension indication to a user equipment. The method may further include receiving from the user equipment a first message indicating at least one capability of the user equipment.

In accordance with some example embodiments, a computer program product may perform a method. The method may include transmitting at least one time domain resource assignment extension indication to a user equipment. The method may further include receiving from the user equipment a first message indicating at least one capability of the user equipment.

In accordance with certain example embodiments, an apparatus may include at least one processor and at least one memory storing instructions that, when executed by the at least one processor, cause the apparatus at least to transmit at least one time domain resource assignment extension indication to a user equipment. The at least one memory and instructions, when executed by the at least one processor, may further cause the apparatus at least to receive from the user equipment a first message indicating at least one capability of the user equipment.

In accordance with various example embodiments, an apparatus may include transmitting circuitry configured to transmit at least one time domain resource assignment extension indication to a user equipment. The apparatus may further include receiving circuitry configured to receive from the user equipment a first message indicating at least one capability of the user equipment.

BRIEF DESCRIPTION OF THE DRAWINGS

For a proper understanding of example embodiments, reference should be made to the accompanying drawings, wherein.

DETAILED DESCRIPTION

Figure 1:
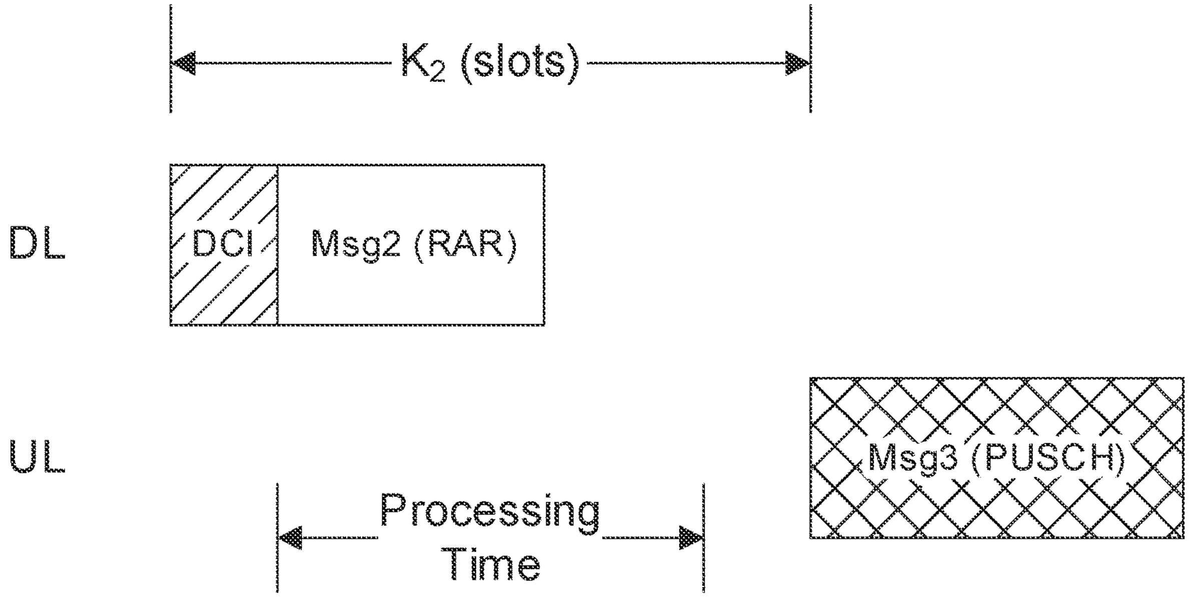
FIG. 1 illustrates an example of a scheduling delay between message 2 and message 3.

It will be readily understood that the components of certain example embodiments, as generally described and illustrated in the figures herein, may be arranged and designed in a wide variety of different configurations. Thus, the following detailed description of some example embodiments of systems, methods, apparatuses, and computer program products for allowing for larger processing time for reduced capability UE without increasing the message 3 (Msg3) transmission delay for legacy UE is not intended to limit the scope of certain example embodiments, but is instead representative of selected example embodiments.

3GPP Release (Rel)-18 is continuing development of reduced capability (RedCap) NR devices by specifying support for further complexity reduction of RedCap devices with baseband (BB) bandwidth or resource block reduction to 5 MHz for physical downlink shared channel (PDSCH) and physical uplink shared channel (PUSCH) only. The RF bandwidth may be similar or the same as Rel-17 RedCap devices (i.e., 20 MHZ). Other physical channels and signals may also be allowed to use a bandwidth part (BWP) up to 20 MHz maximum UE bandwidth.

For UE BB bandwidth reduction in random access response (RAR) (e.g., PDSCH) to Rel-18 RedCap UEs, the scheduling of RAR PDSCH may be larger than the maximum number of unicast physical resource blocks (PRBs) that the UE can process per slot. When the scheduling of RAR PDSCH is within (i.e., smaller than or equal to) a maximum number of unicast PRBs that the UE can process per slot, a legacy time between RAR reception and Msg3 transmission (not smaller than $N_{T,1}+N_{T,2}+0.5$ ms) may be applied.

When the scheduling of RAR PDSCH is larger than the maximum number of unicast PRBs that the UE can process per slot, the UE may receive the RAR and transmit Msg3 if the time domain resource assignment (TDRA) for Msg3 in the uplink (UL) grant in RAR indicates that the time between RAR reception and Msg3 transmission is not smaller than $N_{T,1}+N_{T,2}+0.5+X$ ms; otherwise, UE behavior is controlled by the UE implementation.

For UE BB bandwidth reduction, for PUSCH, 25 PRBs for 15 kHz sub-carrier spacing (SCS) and 12 PRBs for 30 kHz SCS may be selected for the maximum number of PRBs that the UE can transmit per slot or per hop. Alternatively, for UE BB bandwidth reduction, for PDSCH (for both unicast and broadcast), 25 PRBs for 15 kHz SCS and 12 PRBs for 30 kHz SCS may be selected for the maximum number of PRBs that the UE can process per slot.

These options may allow for the number of PRBs used for scheduling RAR to exceed this maximum number of PRBs with the understanding that the RAR can still be processed for decoding but will take longer than for a legacy UE, as well as control the maximum number of PRBs of PDSCH that the UE can process per slot. This may allow for an extension of the minimum gap between the RAR and the Msg3 (i.e., scheduled by the RAR) for Rel-18 RedCap UEs by providing the UEs more time to decode the RAR such that they will be able to transmit Msg3 in the scheduled resources. The extension may be supported through parameter X.

Further techniques may support additional separate early indications (i.e., indication of UE capability or type during the random access procedure) for the Rel-18 RedCap UE. For example, in Rel-17, early indication based on message 1 (Msg1) and Msg3 may be supported; similar methods may be extended for early indication of Rel-18 UEs.

When message 2 (Msg2) PDSCH allocation is larger than the maximum number of unicast PRBs that the UE can process per slot, processing time for the Rel-18 RedCap UE may be increased by X ms (up to 2 ms depending on the final agreed value). In NR, the delay between the downlink control information (DCI) slot and the PUSCH slot may be given by $K_2$, as shown in FIG. 1.

Possible $K_2$ values may be configured via RRC parameter pusch-Time DomainAllocationList. For RAR, this parameter may be part of the PUSCH-ConfigCommon information element. An example of a default pusch-TimeDomainAllocationList configuration is provided in the table below, where j is a subcarrier-specific value. The default configuration may be used when the parameter pusch-TimeDomainAllocationList is not configured in PUSCH-ConfigCommon information element.

| Row index | PUSCH mapping type | $K_2$ | S | L |
|---|---|---|---|---|
| 1 | Type A | j | 0 | 14 |
| 2 | Type A | j | 0 | 12 |
| 3 | Type A | j | 0 | 10 |
| 4 | Type B | j | 2 | 10 |
| 5 | Type B | j | 4 | 10 |
| 6 | Type B | j | 4 | 8 |
| 7 | Type B | j | 4 | 6 |
| 8 | Type A | j + 1 | 0 | 14 |
| 9 | Type A | j + 1 | 0 | 12 |
| 10 | Type A | j + 1 | 0 | 10 |
| 11 | Type A | j + 2 | 0 | 14 |
| 12 | Type A | j + 2 | 0 | 12 |
| 13 | Type A | j + 2 | 0 | 10 |
| 14 | Type B | J | 8 | 6 |
| 15 | Type A | j + 3 | 0 | 14 |
| 16 | Type A | j + 3 | 0 | 10 |

With the introduction of Rel-18 RedCap UE, the network would have to configure pusch-TimeDomainAllocationList in PUSCH-ConfigCommon while considering the additional delay. Two approaches are possible that define new tables. In a first approach, some entries may contain longer $K_2$ values to account for the additional delay; however, this may reduce PUSCH scheduling flexibility for both legacy and Rel-18 RedCap UEs. These entries will be used when the RAR PDSCH exceeds the maximum number of PRBs. This reduces PUSCH scheduling flexibility for both legacy and Rel-18 RedCap UEs. For instance, using the default table as shown above, only 8 values would be available for use if X=1 slot and the RAR PDSCH allocation is larger than the maximum number of PRBs that the UE can process in a slot. A second approach may use larger $K_2$ values for all entries to preserve PUSCH scheduling flexibility; however, all legacy UEs may suffer additional delays when trying to access the network.

Certain example embodiments described herein may have various benefits and/or advantages to overcome the disadvantages described above. For example, in some example embodiments, only Rel-18 RedCap UE may have additional TDRA extensions and associated delays without impacting the scheduling delay for legacy UE. Furthermore, the extension may be based on X, and therefore there may be no need to define new tables for Rel-18 RedCap UE, which may conserve system information block (SIB) overhead (e.g., system information block type 1 (SIB1)). Thus, certain example embodiments discussed below are directed to improvements in computer-related technology.

Described herein are techniques for extending an TDRA table. In certain example embodiments, when Msg1 early indication is enabled for Rel-18 RedCap UE (e.g., via preamble partitioning or different PRACH resources), the SIB may include a new parameter to indicate enabling of TDRA extension for Msg3 scheduling for Rel-18 RedCap UE. As a non-limiting example, the new parameter may be as follows:

SIB1 message

```
-- ASN1START
-- TAG-SIB1-START
SIB1 ::=                          SEQUENCE {
  ...
  msg3-TimeDomainExtension-RedCap-r18       ENUMERATED {true}
  ...
}
-- TAG-SIB1-STOP
-- ASN1STOP
```

This enumerated parameter may indicate enabling of TDRA extension for Msg3 scheduling for Rel-18 RedCap UE; the UE may then adjust the TDRA based on the value of X. A $K_2$ parameter value for each entry in pusch-TimeDomainAllocationList of PUSCH-ConfigCommon may be extended by a number of slots corresponding to the value X (in ms); thus, if the entry indicates $K_2$=j, then $K_2$ may be extended to j+x, where x=ceil(X/(slot duration)), and ceil( ) is the ceiling function. X may be fixed by specification, configured by higher layer (e.g., indicated in SIB), dynamic depending on the frequency domain resource assignment (FDRA) of Msg2, or any combination thereof.

In various example embodiments, the $K_2$ value may be extended only for those entries in pusch-TimeDomainAllocationList of PUSCH-ConfigCommon for which the time duration of $K_2$ slots is less than $N_{T,1}+N_{T,2}+0.5+X$ ms. For example, if the entry indicates $K_2$=j, where j slots have a duration $T_j$ ms, and if $T_j<N_{T,1}+N_{T,2}+0.5$, then $K_2$ may be extended to j+x, where x=ceil(X/(slot duration)). In another example, if the entry indicates $K_2$=j, where j slots have a duration $T_j$ ms, and if $T_j<N_{T,1}+N_{T,2}+0.5$, then $K_2$ may be extended to j+x, where x is the smallest integer such that $(j+x)*(\text{slot duration})\geq N_{T,1}+N_{T,2}+0.5+X$.

In various example embodiments, the $K_2$ parameter value may be 1-bit. Alternatively, this TDRA extension may be determined implicitly based on the early indication configured (e.g., always enabled with Msg1 early indication, or enabled when certain preambles or preamble groups are used). Furthermore, Rel-18 RedCap UE may use an extended TDRA if Msg2 PDSCH allocation exceeds a certain threshold.

In various example embodiments when Msg1 early indication is not enabled for Rel-18 RedCap UE, the base station may limit the number of PRBs to be used for PDSCH (e.g., to twice the number of PRBs that Rel-18 RedCap UE can process per slot). For example, the number of PRBs to be used for PDSCH may depend on the value of X, which could be configurable by the base station. In case of a large number of RARs, several Msg2s may be transmitted by the base station across multiple slots.

For Rel-18 RedCap UE, Msg3 pre-processing can be performed (e.g., Msg3 preparation and encoding) after Msg1 is sent. This may reduce the PUSCH preparation time so that additional time can be available for RAR (PDSCH) processing.

Figure 2:
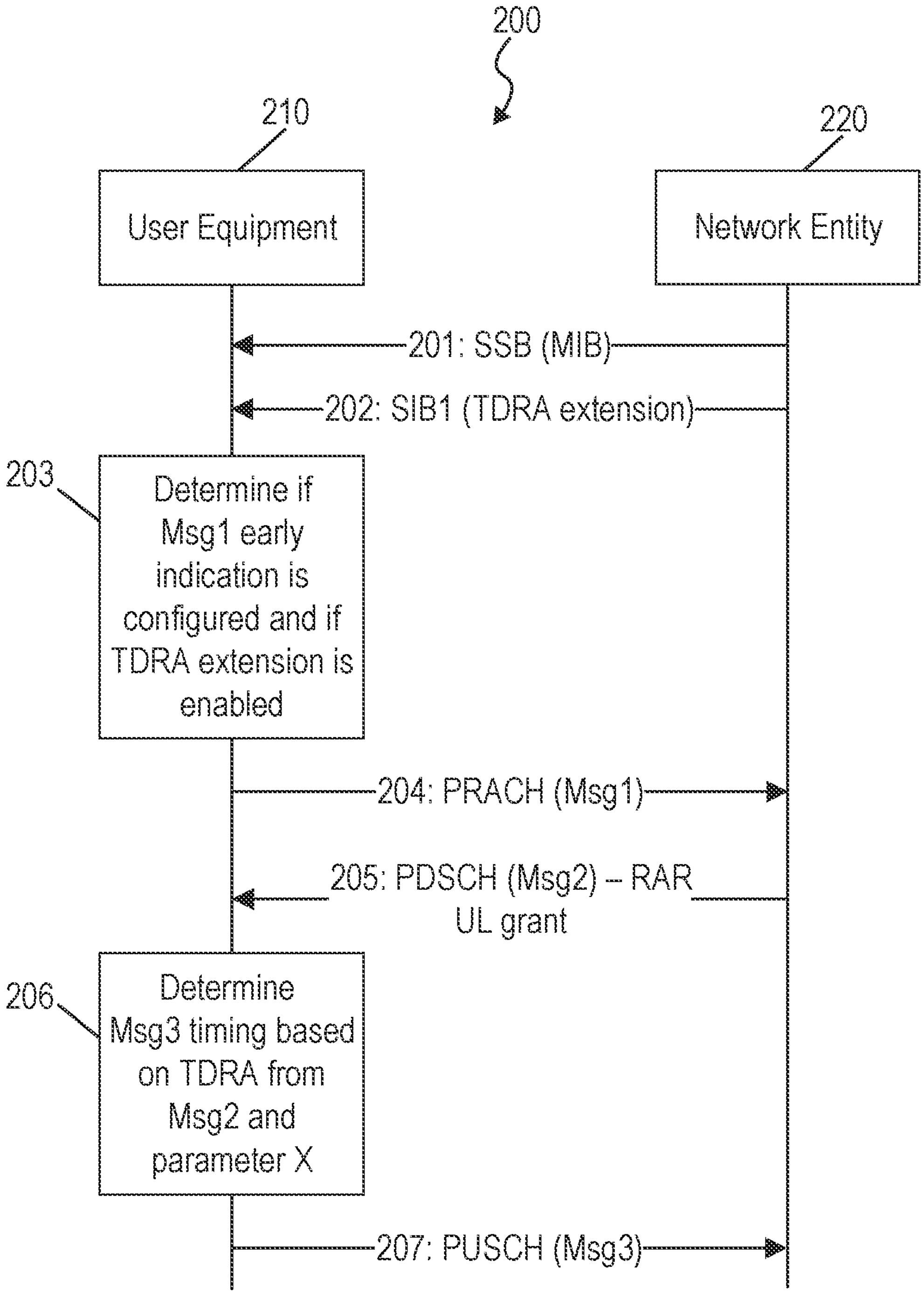
FIG. 2 illustrates an example of a signaling diagram according to certain example embodiments.
Figure 5:
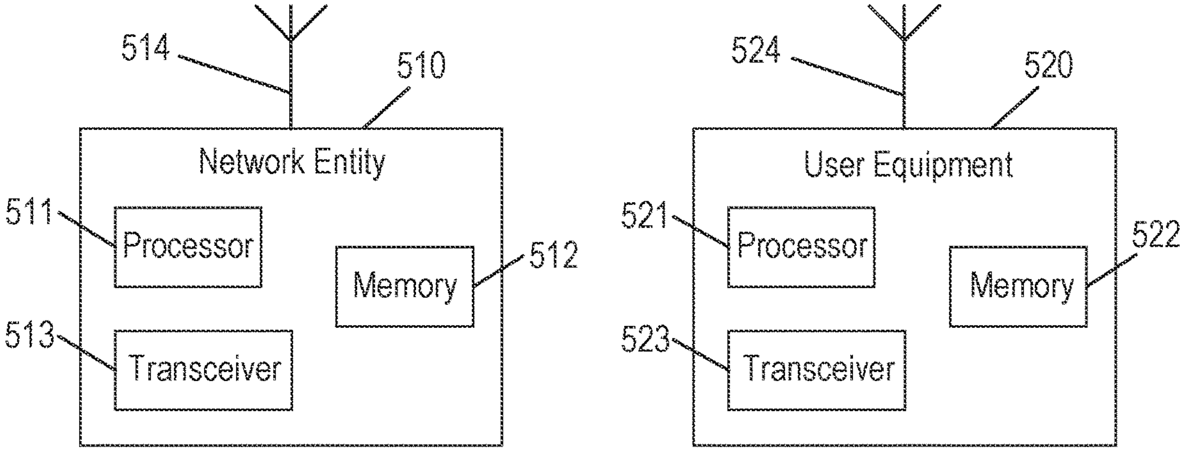
FIG. 5 illustrates an example of certain network devices according to some example embodiments.

FIG. 2 illustrates an example of a signaling diagram for allowing for larger processing time for RedCap UE without increasing the Msg3 transmission delay for legacy UE. NE 220 and UE 210 may be similar to NE 510 and UE 520, as illustrated in FIG. 5, according to certain example embodiments.

At step 201, NE 220 may transmit to UE 210 an SSB (e.g., MIB). The SSB (e.g., MIB) may contain information related to the location of the SIB1, and may include synchronization signals and/or physical broadcast channel (PBCH) carrying the MIB.

At step 202, NE 220 may transmit to UE 210 an SIB1 with at least one TDRA extension parameter (e.g., indication), such as explained above. For example, when a first message (e.g., Msg1) early indication is enabled for Rel-18 RedCap UE (e.g., via preamble partitioning), the SIB1 may include a new at least one TDRA extension parameter to indicate enabling of TDRA extension for second message (e.g., Msg3) scheduling for Rel-18 RedCap UE. This at least one TDRA extension parameter may indicate enabling of TDRA extension for second message (e.g., Msg3) scheduling for Rel-18 RedCap UE.

At step 203, UE 210 may determine whether a first message (e.g., Msg1) early indication is configured, and whether TDRA extension is enabled based upon the at least one TDRA extension parameter received at step 202.

At step 204, UE 210 may transmit to NE 220 a PRACH preamble (e.g., first message (e.g., Msg1)), which may be part of a random access procedure (RAP) for cell access. UE 210 may initiate the RAP by transmitting the first message (e.g., Msg1). The first message (e.g., Msg1) may indicate at least one capability of UE 210.

At step 205, NE 220 may transmit to UE 210 a PDSCH third message (e.g., Msg2)) containing at least one RAR UL grant, which may be part of the RAP that NE 220 may respond to the first message (e.g., Msg1).

At step 206, UE 210 may determine the second message (e.g., Msg3) timing based upon the at least one TDRA extension parameter received at step 202 from the third message (e.g., Msg2) and parameter X. For example, the determination may be performed upon determining that at least one first message (e.g., Msg1) early indication is configured and that TDRA extension is enabled.

At step 207, UE 210 may transmit to NE 220 a PUSCH (e.g., second message (e.g., Msg3)) based upon the determined timing at step 206. For example, UE 210 may transmit a RRC message (e.g., RRC connection request) and/or identity of UE 210 to NE 220.

Figure 3:
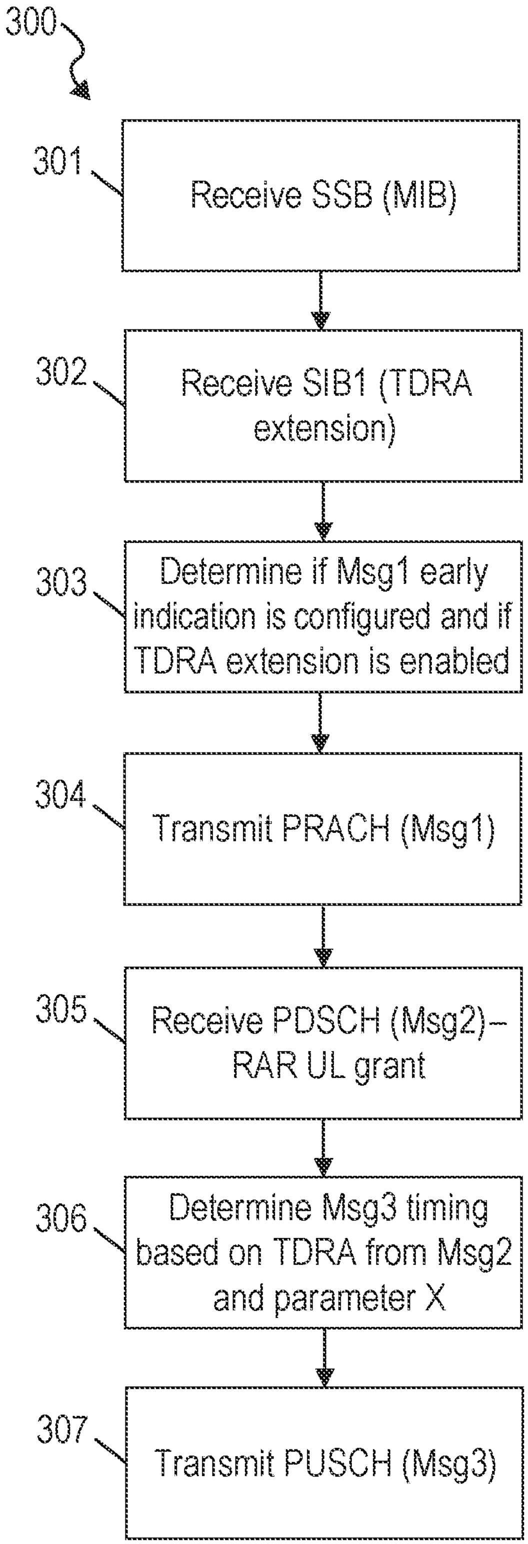
FIG. 3 illustrates an example of a flow diagram of a method that may be performed by a user equipment according to some example embodiments.

FIG. 3 illustrates an example of a flow diagram of a method that may be performed by a UE, such as UE 520 illustrated in FIG. 5, according to various example embodiments.

At step 301, the method may include receiving an SSB (e.g., MIB) message from a NE, such as NE 510 illustrated in FIG. 5. The SSB (e.g., MIB) may contain information related to the location of the SIB1, and may include synchronization signals and/or PBCH carrying the SSB (e.g., MIB).

At step 302, the method may further include receiving an SIB1 with at least one TDRA extension parameter, such as explained above, from the NE. For example, when a first message (e.g., Msg1) early indication is enabled for Rel-18 RedCap UE (e.g., via preamble partitioning), the SIB1 may include a new at least one TDRA extension parameter to indicate enabling of TDRA extension for second message (e.g., Msg3) scheduling for Rel-18 RedCap UE. This at least one TDRA extension parameter may indicate enabling of TDRA extension for second message (e.g., Msg3) scheduling for Rel-18 RedCap UE.

At step 303, the method may further include determining whether a first message (e.g., Msg1) early indication is configured, and whether TDRA extension is enabled based upon the at least one TDRA extension parameter received at step 303.

At step 304, the method may further include transmitting PRACH preamble (e.g., first message (e.g., Msg1)) to the NE, which may be part of a RAP for cell access. The UE may initiate the RAP by transmitting the first message (e.g., Msg1). The first message (e.g., Msg1) may indicate at least one capability of the UE.

At step 305, the method may further include receiving PDSCH third message (e.g., Msg2)) containing at least one RAR UL grant, which may be part of the RAP that the NE may respond to the first message (e.g., Msg1).

At step 306, the method may further include determining the second message (e.g., Msg3) timing based upon the at least one TDRA extension parameter received at step 302 and parameter X. For example, the determination may be performed upon determining that at least one first message (e.g., Msg1) early indication is configured and that TDRA extension is enabled.

At step 307, the method may further include transmitting PUSCH (e.g., second message (e.g., Msg3)) based upon the determined timing at step 306. For example, the UE may transmit a RRC message (e.g., RRC connection request) and/or identity of the UE to the NE.

Figure 4:
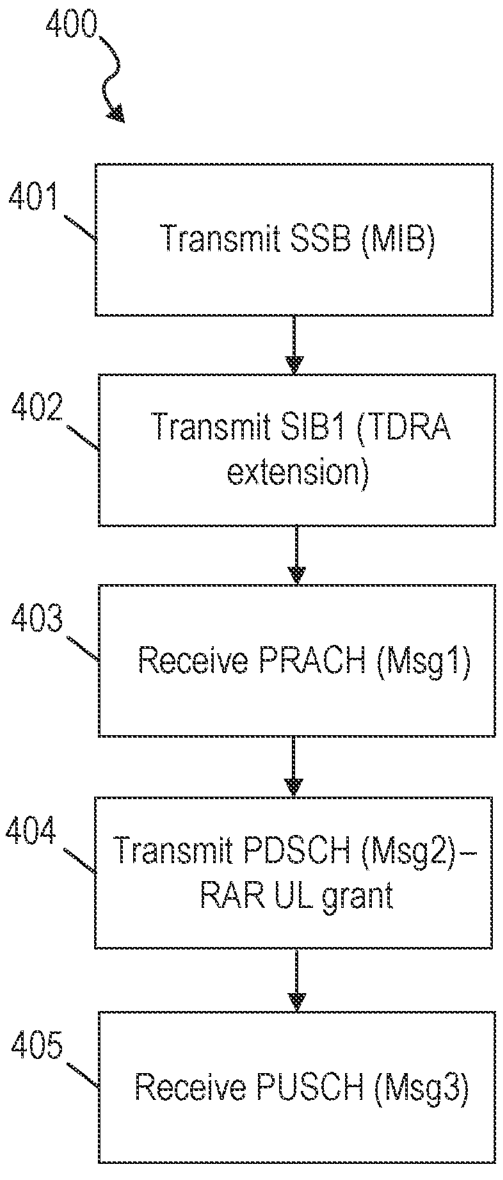
FIG. 4 illustrates an example of a flow diagram of a method that may be performed by a base station according to various example embodiments.

FIG. 4 illustrates an example of a flow diagram of a method that may be performed by a NE, such as NE 510 illustrated in FIG. 5, according to various example embodiments.

At step 401, the method may include transmitting to a UE, such as UE 520 illustrated in FIG. 5, an SSB (e.g., MIB). The SSB (e.g., MIB) may contain information related to the location of the SIB1, and may include synchronization signals and/or PBCH carrying the MIB.

At step 402, the method may further include transmitting to the UE an SIB1 with at least one TDRA extension parameter, such as explained above. For example, when a first message (e.g., Msg1) early indication is enabled for Rel-18 RedCap UE (e.g., via preamble partitioning), the SIB1 may include a new at least one TDRA extension parameter to indicate enabling of TDRA extension for second message (e.g., Msg3) scheduling for Rel-18 RedCap UE. This at least one TDRA extension parameter may indicate enabling of TDRA extension for second message (e.g., Msg3) scheduling for Rel-18 RedCap UE.

At step 403, the method may further include receiving from the UE a PRACH message (e.g., first message (e.g., Msg1)), which may be part of a RAP for cell access. The UE may initiate the RAP by transmitting the first message (e.g., Msg1). The first message (e.g., Msg1) may indicate at least one capability of UE 210.

At step 404, the method may further include transmitting to the UE a PDSCH third message (e.g., Msg2)) containing at least one RAR UL grant, which may be part of the RAP that the NE may respond to the first message (e.g., Msg1).

At step 405, the method may include receiving from the UE a PUSCH (e.g., second message (e.g., Msg3)). For example, the NE may receive from the UE a RRC message (e.g., RRC connection request) and/or identity of the UE.

FIG. 5 illustrates an example of a system according to certain example embodiments. In one example embodiment, a system may include multiple devices, such as, for example, NE 510 and/or UE 520.

NE 510 may be one or more of a base station (e.g., 3G UMTS NodeB, 4G LTE Evolved NodeB, or 5G NR Next Generation NodeB), a serving gateway, a server, and/or any other access node or combination thereof.

NE 510 may further include at least one gNB-centralized unit (CU), which may be associated with at least one gNB-distributed unit (DU). The at least one gNB-CU and the at least one gNB-DU may be in communication via at least one F1 interface, at least one $X_n$-C interface, and/or at least one NG interface via a $5^{th}$ generation core (5GC).

UE 520 may include one or more of a mobile device, such as a mobile phone, smart phone, personal digital assistant (PDA), tablet, or portable media player, digital camera, pocket video camera, video game console, navigation unit, such as a global positioning system (GPS) device, desktop or laptop computer, single-location device, such as a sensor or smart meter, or any combination thereof. Furthermore, NE 510 and/or UE 520 may be one or more of a citizens broadband radio service device (CBSD).

NE 510 and/or UE 520 may include at least one processor, respectively indicated as 511 and 521. Processors 511 and 521 may be embodied by any computational or data processing device, such as a central processing unit (CPU), application specific integrated circuit (ASIC), or comparable device. The processors may be implemented as a single controller, or a plurality of controllers or processors.

At least one memory may be provided in one or more of the devices, as indicated at 512 and 522. The memory may be fixed or removable. The memory may include computer program instructions or computer code contained therein. Memories 512 and 522 may independently be any suitable storage device, such as a non-transitory computer-readable medium. The term "non-transitory," as used herein, may correspond to a limitation of the medium itself (i.e., tangible, not a signal) as opposed to a limitation on data storage persistency (e.g., random access memory (RAM) vs. read-only memory (ROM)). A hard disk drive (HDD), random access memory (RAM), flash memory, or other suitable memory may be used. The memories may be combined on a single integrated circuit as the processor, or may be separate from the one or more processors. Furthermore, the computer program instructions stored in the memory, and which may be processed by the processors, may be any suitable form of computer program code, for example, a compiled or interpreted computer program written in any suitable programming language.

Processors 511 and 521, memories 512 and 522, and any subset thereof, may be configured to provide means corresponding to the various blocks of FIGS. 2-4. Although not shown, the devices may also include positioning hardware, such as GPS or micro electrical mechanical system (MEMS) hardware, which may be used to determine a location of the device. Other sensors are also permitted, and may be configured to determine location, elevation, velocity, orientation, and so forth, such as barometers, compasses, and the like.

As shown in FIG. 5, transceivers 513 and 523 may be provided, and one or more devices may also include at least one antenna, respectively illustrated as 514 and 524. The device may have many antennas, such as an array of antennas configured for multiple input multiple output (MIMO) communications, or multiple antennas for multiple RATs. Other configurations of these devices, for example, may be provided. Transceivers 513 and 523 may be a transmitter, a receiver, both a transmitter and a receiver, or a unit or device that may be configured both for transmission and reception.

The memory and the computer program instructions may be configured, with the processor for the particular device, to cause a hardware apparatus, such as UE, to perform any of the processes described above (i.e., FIGS. 2-4). Therefore, in certain example embodiments, a non-transitory computer-readable medium may be encoded with computer instructions that, when executed in hardware, perform a process such as one of the processes described herein. Alternatively, certain example embodiments may be performed entirely in hardware.

In certain example embodiments, an apparatus may include circuitry configured to perform any of the processes or functions illustrated in FIGS. 2-4. As used in this application, the term "circuitry" may refer to one or more or all of the following: (a) hardware-only circuit implementations (such as implementations in only analog and/or digital circuitry), (b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions), and (c) hardware circuit(s) and or processor(s), such as a microprocessor(s) or a portion of a microprocessor(s), that requires software (e.g., firmware) for operation, but the software may not be present when it is not needed for operation. This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

Figure 6:
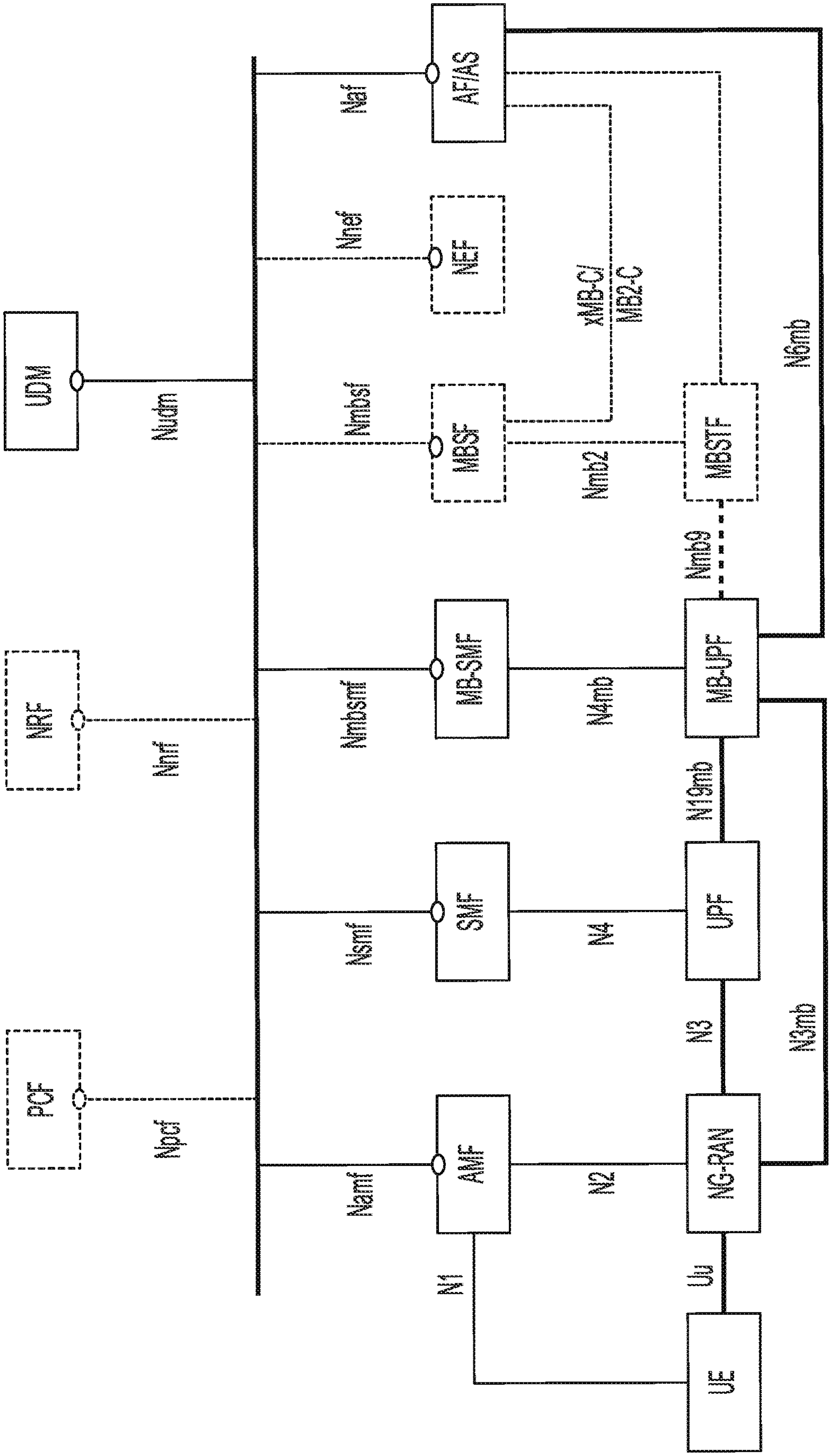
FIG. 6 illustrates an example of a 5G network and system architecture according to some example embodiments.

FIG. 6 illustrates an example of a 5G network and system architecture according to certain example embodiments. Shown are multiple network functions that may be implemented as software operating as part of a network device or dedicated hardware, as a network device itself or dedicated hardware, or as a virtual function operating as a network device or dedicated hardware. The NE and UE illustrated in FIG. 6 may be similar to NE 510 and UE 520, respectively. The user plane function (UPF) may provide services such as intra-RAT and inter-RAT mobility, routing and forwarding of data packets, inspection of packets, user plane quality of service (QOS) processing, buffering of downlink packets, and/or triggering of downlink data notifications. The application function (AF) may primarily interface with the core network to facilitate application usage of traffic routing and interact with the policy framework.

According to certain example embodiments, processors 511 and 521, and memories 512 and 522, may be included in or may form a part of processing circuitry or control circuitry. In addition, in some example embodiments, transceivers 513 and 523 may be included in or may form a part of transceiving circuitry.

In some example embodiments, an apparatus (e.g., NE 510 and/or UE 520) may include means for performing a method, a process, or any of the variants discussed herein. Examples of the means may include one or more processors, memory, controllers, transmitters, receivers, and/or computer program code for causing the performance of the operations.

In various example embodiments, apparatus 520 may be controlled by memory 522 and processor 521 to receive at least one time domain resource assignment extension indication from a network entity; determine whether at least one first message early indication is configured and whether time domain resource assignment extension is enabled based on the received at least one time domain resource assignment extension indication; and, upon determining that at least one first message early indication is configured and that time domain resource assignment extension is enabled, determine a timing of a second message based on the at least one time domain resource assignment extension indication and a time parameter associated with the at least one time domain resource assignment extension.

Certain example embodiments may be directed to an apparatus that includes means for performing any of the methods described herein including, for example, means for receiving at least one time domain resource assignment extension indication from a network entity; means for determining whether at least one first message early indication is configured and whether time domain resource assignment extension is enabled based on the received at least one time domain resource assignment extension indication; and means for, upon determining that at least one first message early indication is configured and that time domain resource assignment extension is enabled, determine a timing of a second message based on the at least one time domain resource assignment extension indication and a time parameter associated with the at least one time domain resource assignment extension.

In various example embodiments, apparatus 510 may be controlled by memory 512 and processor 511 to transmit at least one time domain resource assignment extension indication to a user equipment; and receive from the user equipment a first message indicating at least one capability of the user equipment.

Certain example embodiments may be directed to an apparatus that includes means for performing any of the methods described herein including, for example, means for transmitting at least one time domain resource assignment extension indication to a user equipment; and means for receiving from the user equipment a first message indicating at least one capability of the user equipment.

The features, structures, or characteristics of example embodiments described throughout this specification may be combined in any suitable manner in one or more example embodiments. For example, the usage of the phrases "various embodiments," "certain embodiments," "some embodiments," or other similar language throughout this specification refers to the fact that a particular feature, structure, or characteristic described in connection with an example embodiment may be included in at least one example embodiment. Thus, appearances of the phrases "in various embodiments," "in certain embodiments," "in some embodiments," or other similar language throughout this specification does not necessarily all refer to the same group of example embodiments, and the described features, structures, or characteristics may be combined in any suitable manner in one or more example embodiments.

As used herein, "at least one of the following: <a list of two or more elements>" and "at least one of <a list of two or more elements>" and similar wording, where the list of two or more elements are joined by "and" or "or," mean at least any one of the elements, or at least any two or more of the elements, or at least all the elements.

Additionally, if desired, the different functions or procedures discussed above may be performed in a different order and/or concurrently with each other. Furthermore, if desired, one or more of the described functions or procedures may be optional or may be combined. As such, the description above should be considered as illustrative of the principles and teachings of certain example embodiments, and not in limitation thereof.

One having ordinary skill in the art will readily understand that the example embodiments discussed above may be practiced with procedures in a different order, and/or with hardware elements in configurations which are different than those which are disclosed. Therefore, although some embodiments have been described based upon these example embodiments, it would be apparent to those of skill in the art that certain modifications, variations, and alternative constructions would be apparent, while remaining within the spirit and scope of the example embodiments.

Partial Glossary

3GPP 3$^{rd}$ Generation Partnership Project
5G 5$^{th}$ Generation
5GC 5$^{th}$ Generation Core
6G 6$^{th}$ Generation
AF application function
ASIC application specific integrated circuit
BB baseband
BS base station
BWP bandwidth part
CBSD citizens broadband radio service device
CN core network
CPU central processing unit
CU centralized unit
DCI downlink control information
DU distributed unit
eMBB enhanced mobile broadband
eNB evolved node B
eRedCap evolved reduced capability
FDRA frequency domain resource assignment
gNB next generation node B
GPS global positioning system
HDD hard disk drive
IoT Internet of Things
LTE Long-Term Evolution
LTE-A Long-Term Evolution Advanced
MEMS micro electrical mechanical system
MIMO multiple input multiple output
mMTC massive machine type communication
Msg1 message 1
Msg2 message 2
Msg3 message 3
NE network entity
NG next generation NG-eNB next generation evolved node B
NG-RAN next generation radio access network
NR new radio NR
PDA personal digital assistance
PDSCH physical downlink shared channel
PRACH physical random access channel
PRB physical resource block
PUSCH physical uplink shared channel
QoS quality of service
RAM random access memory
RAN radio access network
RAP radio access procedure
RAR random access response
RAT radio access technology
RedCap reduced capability
RF radio frequency
ROM read-only memory
RRC radio resource control
SCS sub-carrier spacing
SINR signal-to-interference-plus-noise ratio
SIB system information block
SSB synchronization signal block
TDRA time domain resource assignment
UE user equipment
UMTS universal mobile telecommunications system
UPF user plane function
URLLC ultra-reliable and low-latency communication
UTRAN universal mobile telecommunications system terrestrial radio access network

We claim:

1. An apparatus comprising:

at least one processor; and at least one memory storing instructions that, when executed by the at least one processor, cause the apparatus at least to:

receive, from a network entity, a synchronization signal block (SSB) message comprising information related to a location of a system information block type 1 (SIB1), wherein the SSB further includes synchronization signals and physical broadcast channel (PBCH) carrying the SSB;

receive the SIB1 comprising at least one time domain resource assignment extension indication from the network entity;

determine whether at least one first message early indication is configured and whether time domain resource assignment extension is enabled based on the received at least one time domain resource assignment extension indication, wherein the at least one first message early indication is configured via preamble partitioning or different physical random access channel resources;

transmit to the network entity a first message indicating at least one capability of the apparatus, wherein transmitting the first message initiates a radio access procedure, wherein the first message comprises a physical random access channel preamble;

receive from the network entity a third message as a response to the first message, wherein the third message includes at least one random access response uplink grant which is a part of the radio access procedure, wherein the third message comprises a physical downlink shared channel message having an allocation that is larger than a maximum number of unicast physical resource blocks that the apparatus can process per slot;

upon determining that at least one first message early indication is configured and that time domain resource assignment extension is enabled, determine a timing of a second message based on the at least one time domain resource assignment extension indication and a time parameter X associated with the at least one time domain resource assignment extension, wherein determining the timing of the second message comprises extending a $K_2$ value of an entry in a pusch-TimeDomainAllocationList of a PUSCH-ConfigCommon information element by a number of slots corresponding to the time parameter X, such that, when the entry indicates $K_2=j$, the $K_2$ value is extended to j+x, where:

$K_2$ is a delay between a downlink control information slot and a physical uplink shared channel slot, j is an initial value of $K_2$ indicated by the entry in the pusch-TimeDomainAllocationList, X is an additional processing time for the apparatus to process the third message, x is a number of slots corresponding to X, and x=ceil(X/(slot duration)), ceil( ) is a ceiling function, and slot duration is a duration of one slot; and transmit to the network entity the second message based on the determined timing of the second message, wherein the second message includes a radio resource control request and an identity of the apparatus.

* * * * *